United States Patent [19]

Huang et al.

[11] Patent Number: 4,875,849
[45] Date of Patent: Oct. 24, 1989

[54] RUBBER SHAPING MACHINE

[76] Inventors: Jin S. Huang; Jin L. Huang, both of No. 1, Lan Tsun Rd., Lan Tsun Li, Feng Yuan, Taichung Hsien, Taiwan

[21] Appl. No.: 167,776

[22] Filed: Mar. 14, 1988

[51] Int. Cl.⁴ ............................................. B29C 45/67
[52] U.S. Cl. .................................... 425/589; 425/547
[58] Field of Search ................. 425/47, 54, 589, 590, 425/450.1, 451, 451.2, DIG. 223, 588, 547, 549, 550

[56] References Cited

U.S. PATENT DOCUMENTS

| | | | |
|---|---|---|---|
| 2,428,275 | 9/1947 | Frankwich et al. | 425/451 |
| 2,790,204 | 4/1957 | Edwards et al. | 425/589 X |
| 3,484,901 | 12/1969 | Anderson | 425/589 X |
| 3,728,060 | 4/1973 | Hehl | 425/451.2 X |
| 3,754,848 | 8/1973 | Choate | 425/589 X |
| 3,914,975 | 10/1975 | Kawano | 425/451.2 X |
| 3,986,805 | 10/1976 | Haines | 425/450.1 X |
| 4,105,385 | 8/1978 | Hehl | 425/451.2 X |
| 4,245,971 | 1/1981 | MacMillan | 425/589 X |
| 4,318,682 | 3/1982 | Larson et al. | 425/47 X |
| 4,345,965 | 8/1982 | Lindenmayer et al. | 425/589 X |

Primary Examiner—Richard L. Chiesa
Attorney, Agent, or Firm—Sheldon & Mak

[57] ABSTRACT

A rubber shaping machine includes an upper mold, an upper middle mold, a lower middle mold, and a lower mold operated by a main oil cylinder and two auxiliary cylinders so as to open the mold in multi-steps. The machine also includes a feeding system capable of being suitably heated and cooled to facilitate the changing and cleaning of the rubber material therein and capable of preventing the rubber material from being hardened. An injection head device is disclosed which prevents the rubber material from being split.

5 Claims, 5 Drawing Sheets

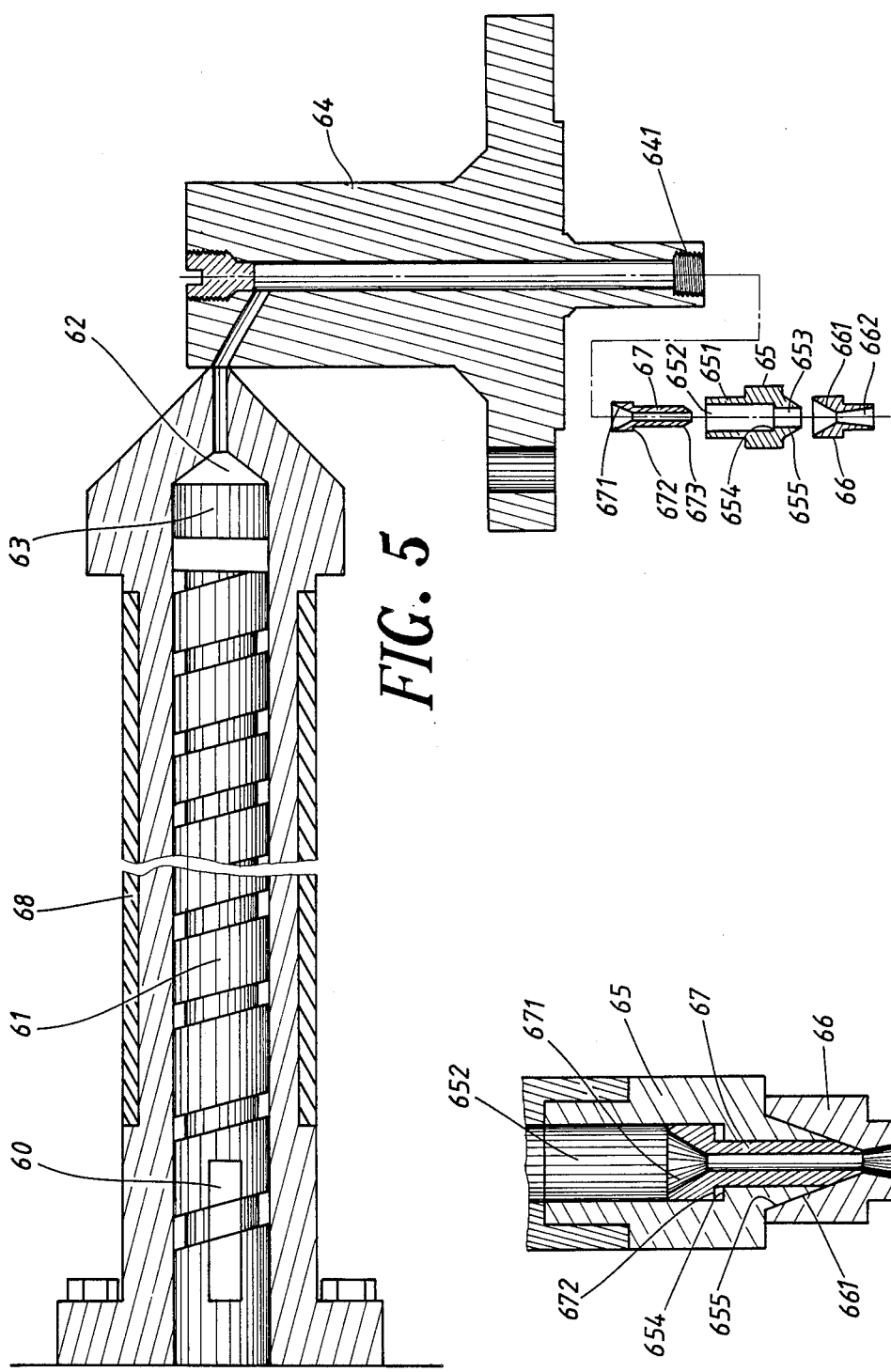

RUBBER SHAPING MACHINE

BACKGROUND OF THE INVENTION

The present invention relates to rubber shaping machines, and more particularly to rubber injecting and vulcanizing shaping machines.

The conventional rubber shaping machine, as shown in FIG. 1, normally includes an upper mold B mounted on a mold frame, a lower mold A vertically and movably mounted under the upper mold and an oil cylinder C for vertically moving the lower mold. Such a machine, however, usually has the following disadvantages:

(1) The piston rod of the oil cylinder withdraws to open the mold at the same low speed at which it rises to close the mold. However, a low retreating speed of the piston rod is unnecessary for the mold to function properly.

(2) The shaped piece cannot easily be taken off the mold merely through the disengagement of the upper and lower molds since it is made of elastic material.

(3) Such a shaping machine has an injection band which is apt to spill the rubber material.

(4) Such a shaping machine cannot be properly heated and cooled, causing trouble in cleaning the material.

There is therefore a need to avoid the above problems.

SUMMARY OF THE INVENTION

An advantage of the present invention is to provide a rubber shaping machine capable of rapidly opening the mold and easily taking off the shaped piece.

A further advantage of the present invention is to provide a rubber shaping machine having a feeding tube capable of being suitably heated and cooled.

Another advantage of the present invention is to provide a rubber shaping material having an injection head capable of preventing the rubber material from being spilt.

According to the present invention, a rubber shaping machine includes an upper mold, an upper middle mold, a lower middle mold and a lower mold operated by a main oil cylinder and two auxiliary cylinders so as to open the mold in multi-steps and at a rapid speed. The machine also includes a feeding system capable of being suitably heated and cooled to facilitate the changing and cleaning of the rubber material therein and to prevent the rubber material from being hardened or spilt.

These and other features, aspects, and advantages of the present invention will become better understood with reference to the following descriptions, appended claims, and accompanying drawings, where:

BRIEF DESCRIPTION OF THE DRAWINGS

FIG. 5 is a schematic view showing a feeding system according to the present invention; and FIG. 6 is a sectional view showing an injection head device of the feeding system according to the present invention.

DETAILED DESCRIPTION OF THE PREFERRED EMBODIMENT

Figure 1:
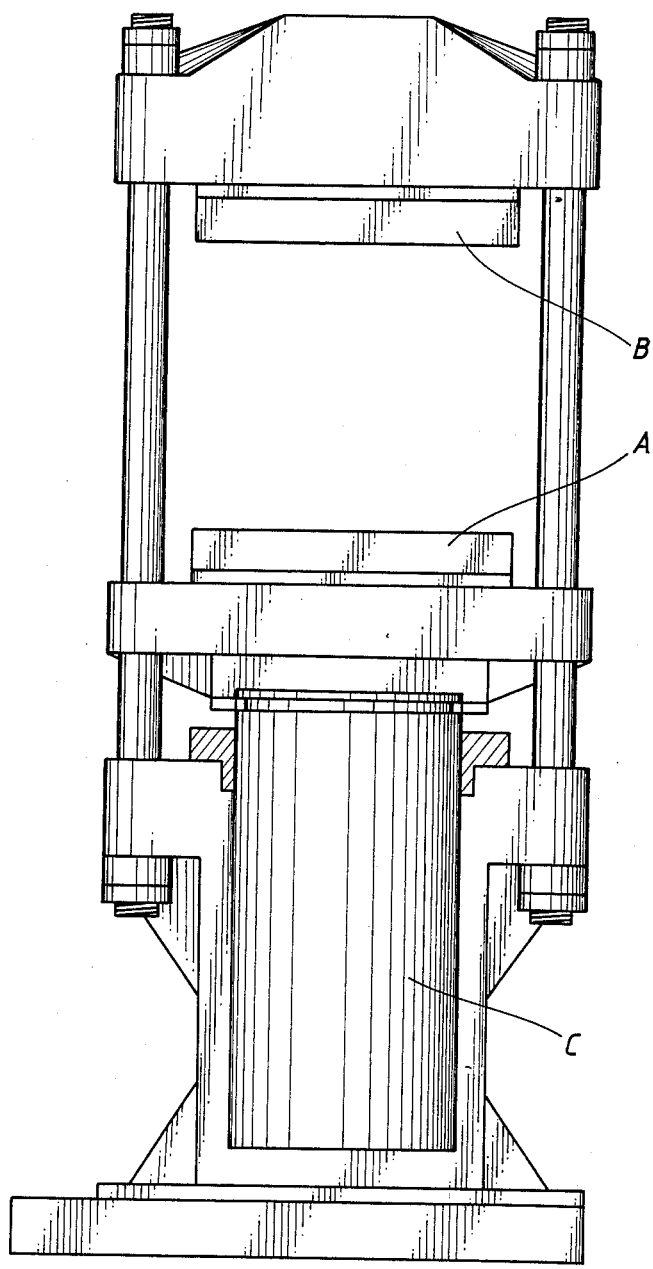
FIG. 1 is a schematic side view showing a rubber shaping machine of the prior art.
Figure 2:
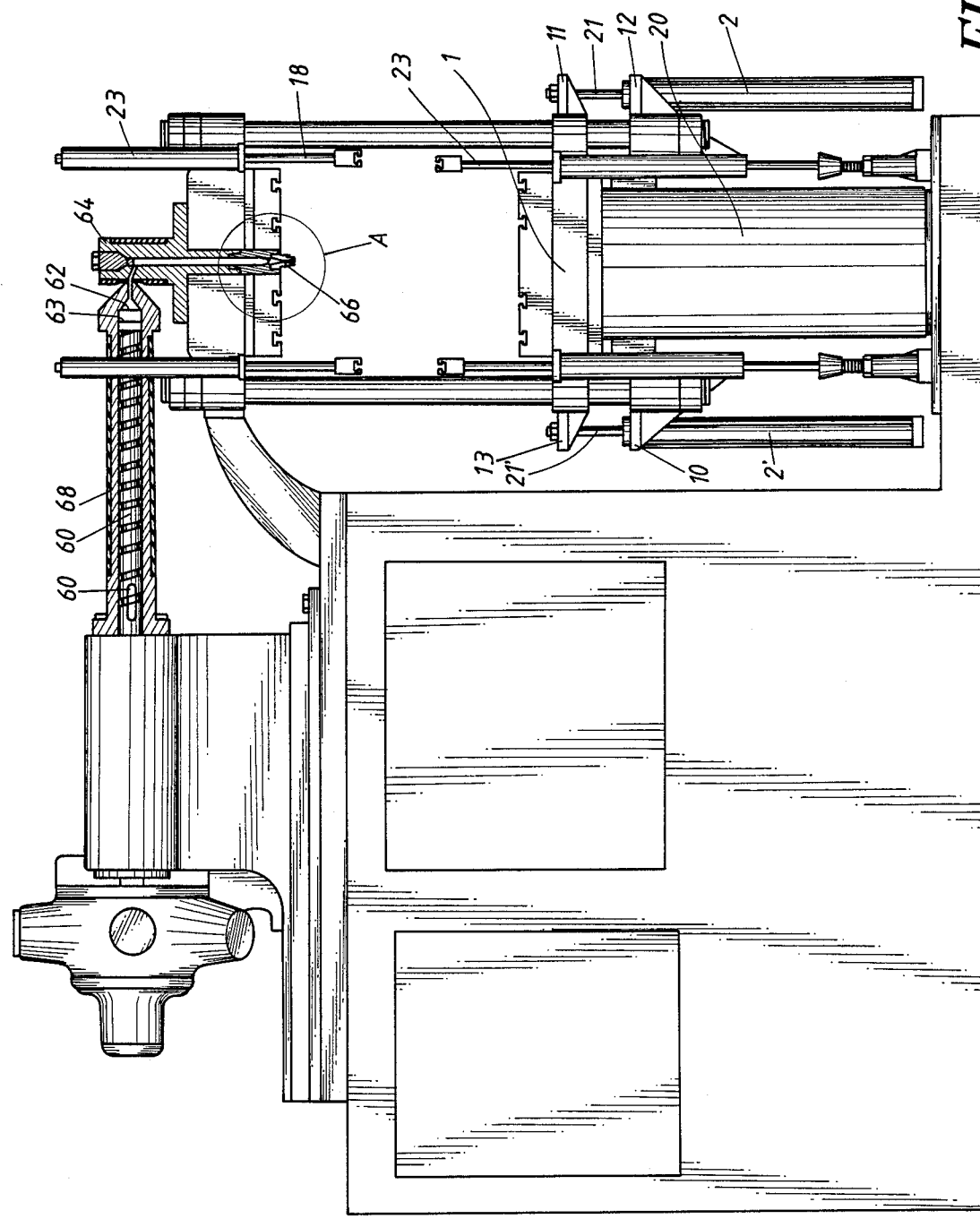
FIG. 2 is a front view schematically showing a rubber shaping machine according the present invention.
Figure 3:
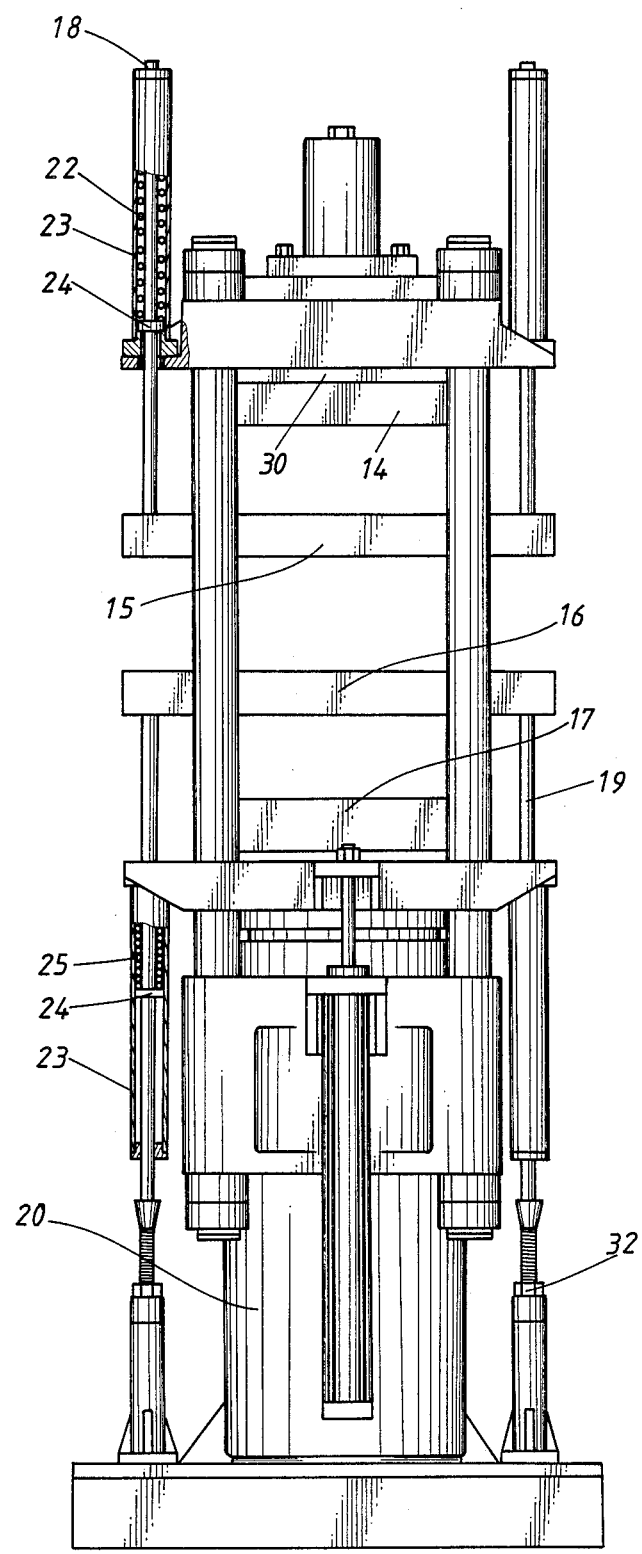
FIG. 3 is a side view schematically showing the rubber shaping machine of FIG. 2 with the mold in an open state.
Figure 4:
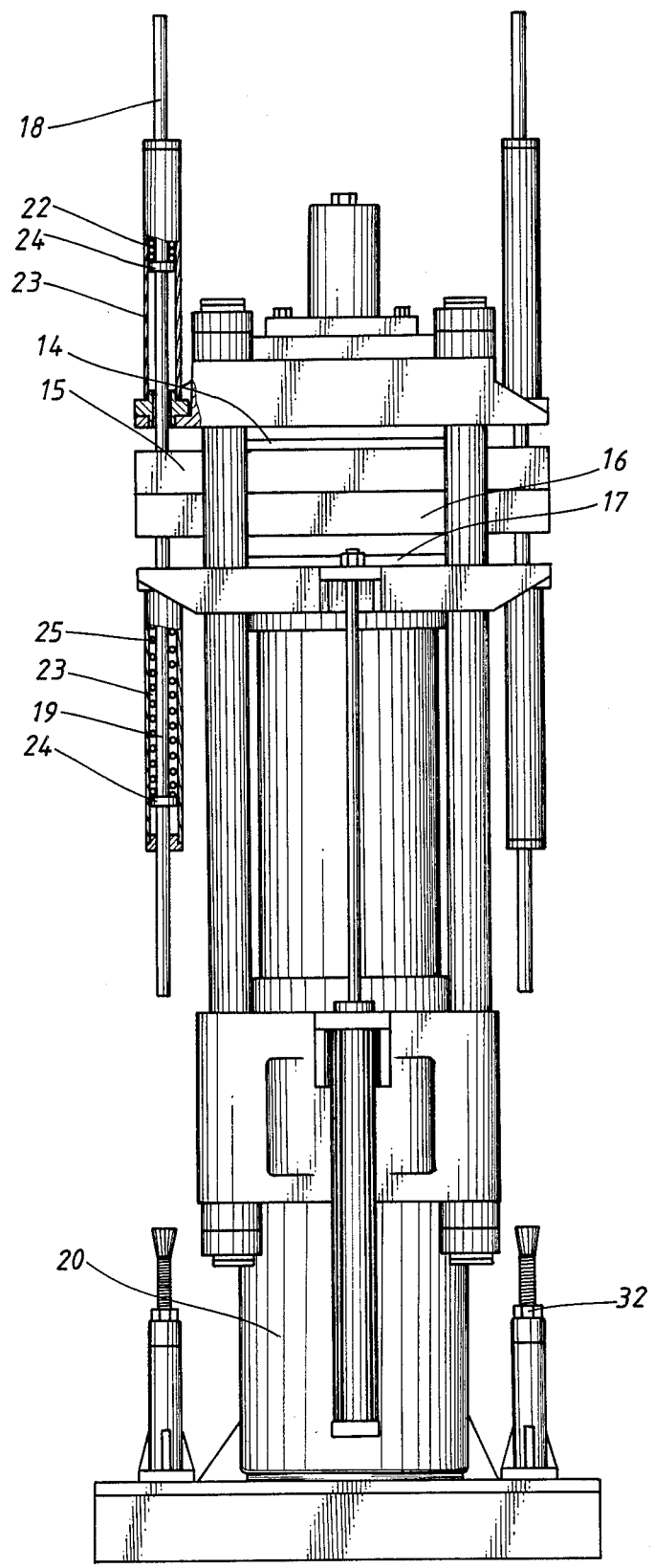
FIG. 4 is a side view schematically showing the rubber shaping machine of FIG. 2 with the mold in a closed state.

Referring now to FIGS. 2, 3, and 4, a rubber shaping machine according to the present invention includes an upper mold 14 mounted on the upper portion 30 of the mold frame, an upper middle mold 15, a lower middle mold 16, a lower mold 17 mounted on a mold support 1 of the mold frame. The mold support 1 has two side flanges 11, 13, a main oil cylinder 20 for vertically moving the lower mold 17, two auxiliary oil cylinders 2, 2' mounted on two flanges 12, 10 respectively of the mold frame and having their respective spindles 21, 21' connected to the side flanges 11, 13.

The rubber shaping machine further includes upper and lower fixing rods, 18, 19, upper and lower sleeves 23, upper and lower springs 22, 25, a feeding tube 61, a storing barrel 64 connected to the feeding tube 61, and an injection head device including a sending head 66 mounted on the storing barrel 64 for injecting a rubber material into a space between the upper and lower molds 14, 17. The upper and lower fixing rods 18, 19 have attachment ends thereof respectively secured to the upper and lower middle molds 15, 16. Each fixing rod 18, 19 includes a flange 24 formed on an intermediate portion thereof. Each sleeve 23 has an inside open and mounted on the mold frame for passing therethrough the attachment ends of each fixing rod 18, 19 and an outside open end capable of passing therethrough the other end of each rod 18, 19. Each spring 22, 25 is mounted between the above mentioned outside open end of each sleeve 23 and flange 24.

Upon closing the mold, oil cylinders 2, 2' operate first to raise lower mold 17. The oil cylinder 20 then operates to help push together molds 14, 15, 16, 17. Upon opening the mold after the shaped piece has been formed between the upper and lower molds 14, 17, the spindles 21, 21' of oil cylinders 2, 2' retreat first and then the upper middle mold 15 will move downwards in accordance with the action of the springs 22 and the force of gravity. When the downward movement of the fixing rods 18 is stopped by the provision of flanges 24, the upper middle mold 15 will stop. However, the lower middle mold 16 and the lower mold 17 continue to move downwards in accordance with the action of the springs 25 and the force of gravity. When the fixing rods 19 are stopped by stopping screw rods 32 and the springs 25 are contracted in sleeves 23, the lower middle mold 16 stops moving downwards while the lower mold 17 continues to move downwardly until the spindles 21, 21' of the oil cylinders 2, 2' reach their lower limits therein.

As shown in FIGS. 5 and 6, the spiral feeding tube 61 is disposed between a feeding inlet 60 and a storing barrel 64. The spiral feeding tube 61 includes a piston 63 and an injecting head 62. The injection head device is provided at the bottom of storing barrel 64 having a threaded hole 641 and includes an injection head body 65, a sending head 66, and an injection head 67. The injection head body 65 has a threaded portion 651 for screwing in threaded hole 641, two communicating holes 652, 653 of different diameters forming therebetween a shoulder 654, and a tapered front end 655. The sending head 66 has a tapered hole 661 for receiving therein front end 655 and an outlet 662 for sending therethrough the rubber material into the space between molds 14, 17. The injection head 67 includes two portions of different diameters forming therebetween a shoulder 672 matching against shoulder 654, a tapered hole 671 for guiding therethrough the rubber material from storing barrel 64 and a tapered front end 673 tightly fitting in tapered hole 661 so as to prevent the rubber material from spilling therebetween. Around the circumference of feeding tube 61, there is provided a spiral heating cooling passage 68 through which a heating or cooling water or oil can pass into storing barrel 64 to heat or cool the rubber material therein.

Through the above description, it will now be clearly known to one skilled in the art how and why the mold of the present machine can be opened smoothly and rapidly. In addition, the injection head can be operated without spilling the rubber material upon injection. Furthermore, the provision of circumferential spiral heating cooling passage 68 enables the temperature of the rubber material to be adjusted.

Although embodiments of the present invention have been described in considerable detail, other versions and embodiments of the invention are possible. Therefore, the present invention is not limited to the embodiments described herein, but instead is defined by the spirit and scope of the appended claims.

What I claim is:

1. A rubber shaping machine comprising:
   a mold frame;
   an upper mold mounted on said mold frame;
   an upper middle mold vertically movably mounted on said mold frame and under said upper mold;
   a lower middle mold vertically movably mounted on said mold frame and under said upper middle mold;
   a lower mold vertically movably mounted on said mold frame and under said lower middle mold;
   a main oil cylinder capable of pushing said lower mold upwards;
   two auxiliary oil cylinders having their respective spindles connected to two opposite sides of said lower mold and capable of pushing it upwards;
   a feeding tube;
   a storing barrel connected to and receiving a rubber material from said feeding tube; and
   an injection head device mounted on said storing barrel for injecting said rubber material into a space between said upper and lower molds.

2. A rubber shaping machine as claimed in claim 1 wherein said injection head device comprises:
   an injection head body attached to said storing barrel and having two communicating holes of different diameters forming therebetween a first shoulder and a first tapered front end;
   a sending head having a first tapered hole receiving therein said front end and an outlet for sending therethrough said rubber material into said space; and
   an injection head having two portions of different diameters forming therebetween a second shoulder for engaging against said first shoulder and having a second tapered hole for guiding therethrough said rubber material and a second tapered front end for tightly fitting in said first tapered hole.

3. A rubber shaping machine as claimed in claim 1 further comprising:
   upper fixing rods having lower ends thereof secured to said upper middle mold, each upper fixing rod including an upper rod flange formed on an intermediate portion thereof;
   lower fixing rods having upper ends thereof secured to said lower middle mold, each lower fixing rod including a lower rod flange formed on an intermediate portion thereof;
   upper rod sleeves for containing portions of said upper fixing rods having first ends mounted on said mold frame for passing therethrough said lower ends of said upper fixing
   rods and having second ends for passing therethrough upper ends of said upper fixing rods;
   lower rod sleeves for containing portions of said lower fixing rods having first ends mounted on said mold frame for passing therethrough upper ends of said lower fixing rods and having second ends for passing therethrough lower ends of said lower fixing rods;
   upper rod springs mounted between said upper ends of said upper fixing rods and said upper rod flanges within said upper rod sleeves; and
   lower rod springs mounted between said upper ends of said lower fixing rods and said lower rod flanges within said lower rod sleeves.

4. A rubber shaping machine as claimed in claim 1 wherein said feeding tube has a heating/cooling passage for regulating the temperature of said rubber material.

5. A rubber shaping machine comprising:
   a mold frame;
   an upper mold frame mounted on said mold frame;
   an upper middle mold vertically movably mounted on said mold frame and under said upper mold;
   a lower middlemold vertically movable mounted on said mold frame and under said upper middle mold;
   a lower mold vertically movably mounted on said mold frame and under said lower middle mold;
   at least one hydraulic means for pushing said lower mold upwards; and
   an injection head device for injecting a rubber material into a space between said upper and lower molds, wherein the injection head device comprises:
   an injection head body having two communicating holes of different diameters forming therebetween a first shoulder and a first tapered front end;
   a sending head having a first tapered hole receiving therein said front end and an outlet for sending therethrough said rubber material into said space; and
   an injection head having two portions of different diameters forming therebetween a second shoulder for engaging against said first shoulder and having a second tapered hole for guiding therethrough said rubber material and a second tapered front end for tightly fitting in said first tapered hole.

* * * * *